Feb. 11, 1969    R. D. RUMSEY    3,426,655
NON-SCORING HYDRODYNAMICALLY BALANCED BUFFER PISTON
Filed Sept. 1, 1966
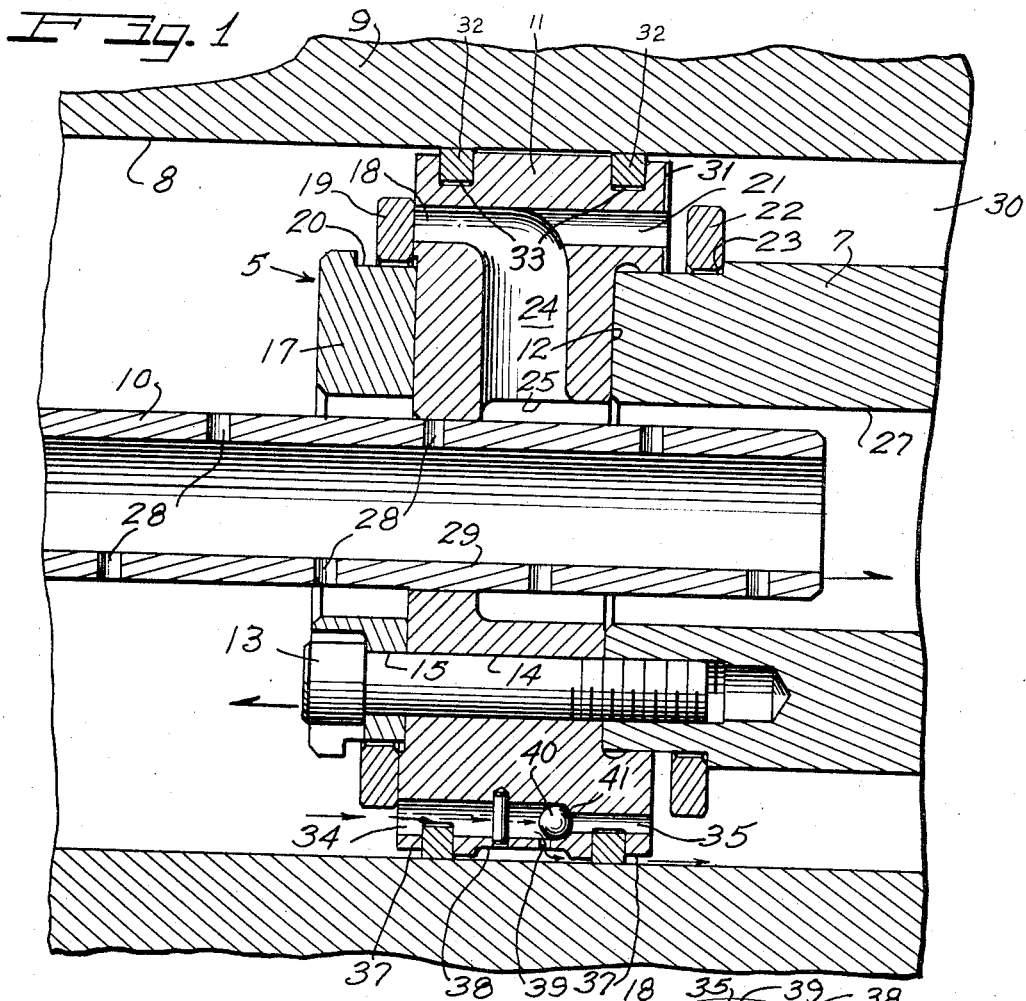
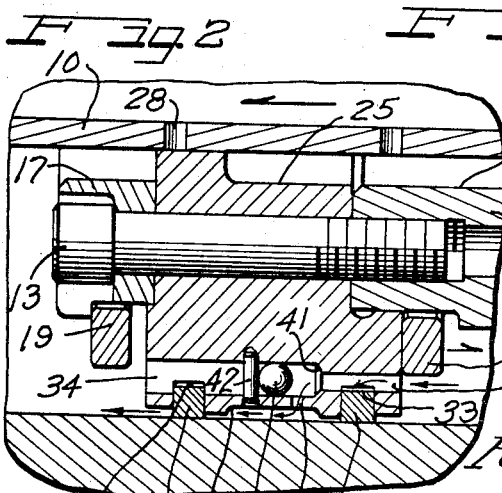
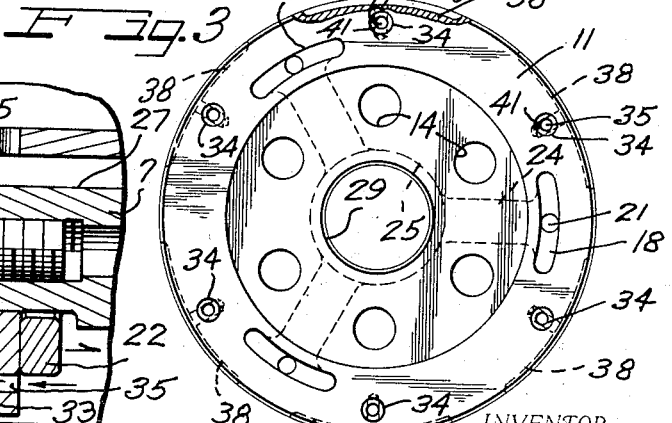
INVENTOR.
Rollin Douglas Rumsey
BY
ATTORNEYS

United States Patent Office 3,426,655
Patented Feb. 11, 1969

3,426,655
NON-SCORING HYDRODYNAMICALLY BALANCED BUFFER PISTON
Rollin Douglas Rumsey, Buffalo, N.Y., assignor to Houdaille Industries, Inc., Buffalo, N.Y., a corporation of Michigan
Filed Sept. 1, 1966, Ser. No. 576,625
U.S. Cl. 92—183        6 Claims
Int. Cl. F01b 31/00

ABSTRACT OF THE DISCLOSURE

A piston has its perimeter of slightly smaller diameter than a cylindrical chamber wall, with circumferentially spaced shallow pressure pad pockets in the periphery and spaced from the opposite ends of the piston. Piston rings are mounted in grooves spaced from the pockets and from the respective opposite ends of the piston. Respective passages through the piston communicate with the piston rod grooves and the pockets and have respective check valves which cause the pressurized fluid on either end of the piston to bypass the pressurized piston ring and enter the pockets from which the fluid leaks under restraint past the piston ring near the low pressure end of the piston.

---

This invention relates to novel means for hydrodynamically balancing pistons operating in the presence of severe hydraulic pressures and further relates to preventing scoring due to foreign matter entering between the piston and the cylinder wall.

In the operation of hydraulic buffers various imbalances in the mechanism or in the mounting, column instability, and the like may, and frequently do cause eccentric or lateral unbalanced loading of the piston during operation. Hence, there is a tendency for the piston to hug the cylinder wall with undue force at the point toward which the unbalance pressure thrusts, resulting in galling.

Another problem in high pressure hydraulic piston and cylinder structures of the type under consideration has resided in scoring as a result of dirt becoming lodged between the piston and the cylinder wall. During pressure thrust dirt in the hydraulic fluid such as oil tends to work into the interface area between the piston and the cylinder wall, especially where there is even ever so slight flexing of the cylinder wall. Such dirt then becomes squeezed between the piston and the cylinder wall.

It is, accordingly, an important object of the present invention to overcome the problems referred to, in a simple, direct manner utilizing the working pressures generated in operation.

Another object of the invention is to provide novel means for hydrodynamically centering pistons in the operation of hydraulic piston and cylinder devices.

A further object of the invention is to provide novel means for cleansing the interface area between a piston and cylinder in a hydraulic device.

Still another object of the invention is to provide novel combination hydrodynamic balancing and interface cleaning means in high pressure hydraulic piston and cylinder devices.

Yet another object of the invention is to provide novel means for preventing scoring between the pistons and cylinder walls of high pressure hydraulic buffers and the like.

Other objects, features and advantages of the present invention will be readily apparent from the following detailed description of a preferred embodiment thereof taken in conjunction with the accompanying drawings in which:

FIGURE 1 is a fragmentary longitudinal diametrical sectional detail view showing a preferred embodiment of the invention;

FIGURE 2 is a fragmentary sectional view similar to FIGURE 1 but showing relationship of certain working parts during reverse operation of the piston within the cylinder; and FIGURE 3 is a front end face elevational view of the piston body itself, partially broken away and in section for illustrative purposes.

In the illustrated embodiment of the invention, a piston 5 mounted on a piston rod 7 is reciprocably operable within a cylinder bore working chamber 8 in a cylinder member 9, the piston being cooperatively related to a metering tube 10. The hydraulic device thus illustrated may comprise part of a high pressure hydraulic buffer of the type described in greater detail in U.S. Patent No. 3,190,634, dated June 22, 1965, the disclosure of which is included herein by reference to the extent necessary for a more comprehensive understanding of the functioning of the subject hydraulic buffer.

For the purpose indicated, the piston 5 comprises a body 11 which may be cast, molded or sintered and has an annular coaxial backface recess 12 within which the end of the piston rod 7 is seated, bolts 13 extending through suitable bolt holes 14 in the piston body and through matching bolt holes 15 in a clamping ring 17 bearing against the inner or front face of the piston body securing the piston on the piston rod and maintaining the piston rod concentric within the cylinder chamber 8. An annular series of ports 18 opening through the front face of the piston body 11 radially outwardly relative to the clamping ring 17 are controlled by a ring valve 19 held to a limited range of unseating movement within an annular outwardly opening groove 20 in the ring 17. Aligned and communicating with the ports 18 are ports 21 opening through the rear face of the piston body 11 and controlled by a ring valve 22 having a limited range of axial movement between the opposing valve body face and a stop shoulder 23 on the piston rod 7.

Free communication between the ports 18 and 21 is effected by way of radial passages 24 in the piston body 11 with a central rearwardly opening clearance recess 25 in the piston body aligned with a central bore 27 in the piston rod 7 into which the metering tube 10 is projectable in the course of a compression pressure stroke of the piston 5 within the cylinder 9 as indicated by the directional half arrows in FIGURE 1. During such compression stroke hydraulic fluid displaces from the cylinder working chamber area in front of the piston through metering orifices 28 extending through the wall of the metering tube 10 in progressively diminishing volume as the orifices are closed off and passed by an annular central bearing bore portion 29 on the front part of the piston body 11. The hydraulic fluid displaced into the metering tube during the compression stroke passes from its free end into the piston rod bore 27 and by way of the passages 24 and the ports 21 into a working chamber area 30 between the cylinder 9 and the piston rod 7 back of the piston 5. During return stroke relative movement of the piston 5 and the cylinder 9 as represented by the directional half arrows in FIGURE 2, the floating disc ring valve 22 seats against the piston head body 11, closing the orifices 21 except for one or more metering grooves 31 in the face of the piston body communicating with the associated port 21. Replenishing fluid issues through the metering tube 10, the passages 24, and the ports 18 past the unseated floating disc ring valve 19 into the forward working chamber of the cylinder.

According to the present invention, advantageous means are provided for hydraulically balancing the piston 5 in centered relation within the cylinder wall 8. In addition, the construction and relationship of the piston to the cylinder wall is such that there is substantial freedom from scoring due to dirt entering between the cylinder barrel or wall and the piston. These features are accomplished in a piston configuration of minimum axial length and with full efficiency under buffing pressures in both axial directions of operation of the piston.

For attaining the desirable attributes just mentioned, the piston body 11 has a maximum outside diameter which is slightly less than the diameter of the cylinder wall 8. To prevent leakage through the clearance thus provided, during buffing movements of the piston within the cylinder in either direction, respective expansible and contractable piston rings 32 are mounted in annular radially outwardly opening piston ring grooves 33 within the outer perimeter of the piston body 11 substantially equally spaced from the respective opposite ends of the body. These grooves are desirably slightly deeper than the normal inside diameter of the respective piston rings 32. Hydraulic pressure is introduced through the end of the piston which is generating the pressure to the inside diameter of the adjacent piston ring 32 by means of a plurality of circumferentially equidistantly spaced bores, comprising bores 34 opening through the front face of the piston body 11, and bores 35 opening through the back face of the piston body 11 and respectively radially outwardly clear of the floating disc valves 19 and 22. Through this arrangement, as the piston travels in an inward compression stroke, the piston ring 32 nearest the front face of the piston is pressurized to effect through sealing sliding engagement with the cylinder wall 8 while the piston ring 32 nearest the back face of the piston is permitted to relax, and, conversely, during return buffing stroke the piston ring 32 nearest the back end of the piston body 11 is pressurized and the front piston ring is permitted to relax. Thereby, actual frictional bearing engagement between the piston and the cylinder is limited to a minimum by the extent of the pressurized piston ring during buffing stroke in either direction. Furthermore, any dirt that may accumulate in the cylinder bore is always pushed ahead of the pressurized piston ring, liability of such dirt being forced between the cylinder wall and ring being minimized by a reduced diameter annular area 37 on the perimeter of the piston body 11 from the adjacent respective end of the body to each of the rings. This arrangement prevents binding of the dirt between the piston and the wall of the cylinder and eliminates scoring.

Hydrodynamic centering of the piston in both directions of buffing pressure is accomplished by introducing hydraulic pressure fluid generated during the buffing strokes of the piston, in either direction into the interface area between the piston body 11 and the cylinder wall 8 and with the piston rings 32 acting as check valves. While the entire between-ring interface area is desirably in an annular gap relation, so as to provide an annular fluid pressure bearing, the balancing action of the pressure fluid is enhanced by circumferentially euidistantly spaced pressure pads of greater depth afforded by shallow pockets 38 provided in the periphery of the piston, body 11 equidistantly spaced from one another. For best results, the centering fluid bearing pad pockets 38 are provided in triplex arrangement or multiples thereof, there being six utilized in the illustrated example. In this instance, the pockets 38 are circumferentially elongated and of substantially uniform depth throughout their length.

For feeding pressure fluid from the operating high pressure end of the piston into the respective pockets 38, the bores 34 and 35 are coaxially aligned with one another and are provided in equal number to the hydrodynamic bearing pad pocket, communicating therewith through a respective orifice 39. To close off the pressure communication bore on the low pressure side in each instance, shuttle valve means are employed, conveniently comprising respective ball valves 40. For this purpose, the bores 34 are of larger diameter than and meet the smaller diameter bores 35 spaced from the respective orifices 39 a sufficient distance to afford a valve seat 41 against which the ball valve 40 is driven by compression stroke fluid pressure to block the bore 35 and afford access for the compression pressure fluid through the orifice 39 into its bearing pad pocket 38, as indicated by directional arrows in FIGURE 1. In the reverse direction, indicated in FIGURE 2, the ball valve 40 is driven from the seat 41 and comes to rest against a stop provided by a pin 42 clear of the orifice 39 but in adequate blocking relation to the bore 34 by having a diameter of the bore 34 and the diameter of the ball 40 adequately closely fitting. This affords ample downstream blockage of the bore 34 during the return stroke buffing movement of the piston, since the pressures involved are not as great as during the compression stroke buffing wherein the ball valve is firmly sealingly driven against the seat 41 by the compression pressure.

Since the hydrodynamic bearing pads are always on the low pressure side of the pressurized piston ring 32, and the other of the piston rings although in relatively contracted, relaxed condition, still acts as an effective check-valve against free flowing movement of pressure fluid thereby, a highly effective automatic, self-regulating hydrodynamic piston-balancing or centering system is provided. Further, the slight downstream pressure fluid displacement around the piston ring 32 which is sufficiently loose axially to permit such displacement to the annular space inside said ring, affords a self-cleaning or flushing action with respect to the balancing pocket area.

It will be understood that variations and modifications may be effected without departing from the spirit and scope of the novel concepts of this invention.

I claim as my invention:
1. In a hydraulic device of the character described:
means defining a hydraulic fluid filled working chamber having a cylindrical wall;
a one-piece piston reciprocably operable in pressure strokes in said chamber, having a periphery of slightly smaller diameter than said wall and opposite ends, with respective piston ring grooves in said periphery adjacent to but spaced from said ends;
respective piston rings in said grooves; and
passage means in said piston providing hydro-dynamic communication between the respective opposite ends of the piston and the interface area between said wall and said piston between said rings, said passage means comprising aligned bores extending inwardly from the respective opposite ends of the piston respectively communicating with said grooves and joining at a ball valve seat intermediate the length of the piston, one of said bores being of larger diameter than the other of said bores and having an orifice extending therefrom to said interface area adjacent to said valve seat;
a ball shuttle valve in close sliding fit within said larger bore and adapted to be driven into position against said seat responsive to pressure fluid working into the larger bore from its end of the piston so as to block the other bore; and
stop means extending across said larger bore spaced from said seat and at the opposite side of said orifice from said seat and stopping the ball valve in that position when it is driven from said seat by pressure fluid entering through the smaller of said bores;
whereby said ball valve is operative in both of said positions to compel passage of pressure fluid through said orifice to said area.

2. A device according to claim 1, having a circumferentially spaced series of shallow piston-centering hydro-dynamic fluid bearing pad pockets in the periphery of the piston in said area and spaced from both of said grooves, each of said pockets having one of said passage means in communication therewith.

3. In a hydraulic device of the character described:
means defining a hydraulic fluid filled working chamber having a cylindrical wall;
a piston reciprocably operable in opposite pressure strokes in said chamber and having a periphery of slightly smaller diameter than said wall, with respective annular piston ring grooves in said periphery adjacent to the opposite ends of the piston and with a substantial interface area of the piston and cylinder wall between said grooves, a circumferential series of equally spaced hydro-dynamic bearing pad shallow sockets in said periphery in said area elongated circumferentially and respective passages extending through said piston in communication at their opposite ends with the opposite ends of the piston and radially inwardly adjacent to each of said pockets with communication with the respective pocket and separately with each of said grooves;
a separate expansible and contractable piston ring in each of said grooves slidably engaging said wall; and
valve means in each of said passages operative in pressure strokes of the piston in said chamber to maintain the associated pocket in communication with the high pressure end of the piston and to place the groove nearest the pressure end of the piston in communication with the pressure end of the piston to pressurize the piston ring in such groove into expanded sealing bearing engagement with said wall while blocking the remaining groove from the pressure end of the piston so that only low pressure communication with such groove permits the piston ring therein to remain relatively contracted to permit it to act as a check-valve against free-flowing movement of pressure fluid thereby but being sufficiently loose to permit metered displacement of fluid from the pocketed area for hydro-dynamic piston balancing and flushing action with respect to said area.

4. A device according to claim 3, in which each of said passages comprises aligned bores of differential diameter meeting intermediate the ends of the piston and providing a ball valve seat with an orifice in spaced adjacency to said seat from the larger diameter bore into the associated pocket, a ball valve in close sliding fit within said larger diameter bore driven against said seat responsive to pressure fluid entering from the end of the piston through which said larger diameter bore opens, said bores respectively communicating with said grooves, and stop means extending across said larger diameter bore spaced from said seat and at the opposite side of said orifice from said seat to stop the ball valve in that position when it is driven from said seat by pressure fluid entering through the smaller diameter bore.

5. A device according to claim 4, in which said bores respectively intersect said grooves and are thereby placed in communication therewith.

6. A device according to claim 3, in which said pockets are arranged in triplex relation circumferentially.

References Cited

UNITED STATES PATENTS

| | | | |
|---|---|---|---|
| 665,506 | 1/1901 | Carlson | 92—183 |
| 1,234,972 | 7/1917 | Trist | 92—183 |
| 1,604,594 | 10/1926 | Nelson | 92—184 |
| 1,618,511 | 2/1927 | Burstall | 92—184 |
| 2,392,182 | 1/1946 | Payne | 92—185 |
| 2,806,451 | 9/1957 | Vinkler | 92—185 |
| 2,914,368 | 11/1959 | Farmer | 92—184 |
| 3,315,902 | 4/1967 | Pollitz | 92—182 |
| 3,319,534 | 5/1967 | Boonshaft | 92—181 |
| 3,334,906 | 8/1967 | Arnold | 92—183 |

CARROLL B. DORITY, JR., *Primary Examiner.*

U.S. Cl. X.R.

92—184